(12) United States Patent
Yoshida et al.

(10) Patent No.: US 9,182,017 B2
(45) Date of Patent: Nov. 10, 2015

(54) BELT-DRIVEN CONTINUOUSLY VARIABLE TRANSMISSION

(75) Inventors: Michio Yoshida, Susono (JP); Yuji Hattori, Gotenba (JP); Tomoaki Yanagida, Susono (JP); Kazunori Harima, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 62 days.

(21) Appl. No.: 14/002,555

(22) PCT Filed: Mar. 31, 2011

(86) PCT No.: PCT/JP2011/058298
§ 371 (c)(1),
(2), (4) Date: Oct. 15, 2013

(87) PCT Pub. No.: WO2012/131999
PCT Pub. Date: Oct. 4, 2012

(65) Prior Publication Data
US 2014/0031154 A1    Jan. 30, 2014

(51) Int. Cl.
| | |
|---|---|
| F16H 59/00 | (2006.01) |
| F16H 61/00 | (2006.01) |
| F16H 63/00 | (2006.01) |
| F16H 9/18 | (2006.01) |
| F16H 55/56 | (2006.01) |
| F16H 9/12 | (2006.01) |

(52) U.S. Cl.
CPC .................. *F16H 9/18* (2013.01); *F16H 9/125* (2013.01); *F16H 55/56* (2013.01)

(58) Field of Classification Search
CPC . F16H 61/66272; F16H 55/56; F16H 61/662; F16H 63/065; F16H 61/66259
USPC ........................................................... 474/28
See application file for complete search history.

(56) References Cited

U.S. PATENT DOCUMENTS

| | | | | |
|---|---|---|---|---|
| 3,195,368 A | * | 7/1965 | Boudewijn ..................... | 477/46 |
| 3,557,640 A | * | 1/1971 | Hendriks et al. ............... | 477/48 |
| 3,782,213 A | * | 1/1974 | Rattunde ........................ | 474/28 |
| 4,023,425 A | * | 5/1977 | Parker ............................ | 474/16 |
| 4,143,558 A | * | 3/1979 | Van Deursen et al. ......... | 474/28 |
| 4,229,988 A | * | 10/1980 | Rattunde ........................ | 474/28 |
| 4,458,318 A | * | 7/1984 | Smit et al. ...................... | 701/51 |

(Continued)

FOREIGN PATENT DOCUMENTS

| | | |
|---|---|---|
| JP | 06-034004 A | 2/1994 |
| JP | 2000-170859 A | 6/2000 |

(Continued)

*Primary Examiner* — Henry Liu
(74) *Attorney, Agent, or Firm* — Sughrue Mion, PLLC

(57) ABSTRACT

A belt-driven continuously variable transmission adapted to prevent a tilting motion of a sheave under high temperature. The belt-driven continuously variable transmission is comprised of a pair of pulleys individually comprised of a fixed sheave rotated integrally with a rotary shaft and a movable sheave fitted onto the rotary shaft while being allowed to reciprocate thereon, and a driving belt applied to the pulleys to transmit power therebetween. a stopper member is disposed on an outer circumferential side and in a side where the driving belt is not contacted with the movable sheave so as to prevent the movable sheave from being tilted to widen a width between the fixed sheave and the movable sheave holding the driving belt by a load from the driving belt.

2 Claims, 2 Drawing Sheets

(56) References Cited

U.S. PATENT DOCUMENTS

| | | | | |
|---|---|---|---|---|
| 4,494,942 A * | 1/1985 | Hirano et al. | | 474/28 |
| 4,575,364 A * | 3/1986 | Lamers | | 474/16 |
| 4,627,313 A * | 12/1986 | Sakai | | 474/18 |
| 4,704,097 A * | 11/1987 | Sakai | | 474/28 |
| 4,717,368 A * | 1/1988 | Yamaguchi et al. | | 474/28 |
| 4,753,627 A * | 6/1988 | Kawamoto | | 474/18 |
| 4,795,407 A * | 1/1989 | Ohsono et al. | | 474/28 |
| 4,871,343 A * | 10/1989 | Hattori | | 474/28 |
| 4,875,893 A * | 10/1989 | Giacosa | | 474/28 |
| 4,881,925 A * | 11/1989 | Hattori | | 474/18 |
| 4,884,997 A * | 12/1989 | Hattori | | 474/28 |
| 4,904,229 A * | 2/1990 | Hattori | | 474/12 |
| 4,913,686 A * | 4/1990 | Hattori | | 474/69 |
| 5,013,283 A * | 5/1991 | d'Herripon | | 474/8 |
| 5,145,464 A * | 9/1992 | Mori | | 474/16 |
| 5,163,880 A * | 11/1992 | Sakai | | 474/28 |
| 5,180,339 A * | 1/1993 | Haley et al. | | 474/28 |
| 5,182,968 A * | 2/1993 | Mott | | 474/11 |
| 5,221,235 A * | 6/1993 | Ogawa | | 474/25 |
| 5,244,437 A * | 9/1993 | Haley et al. | | 474/18 |
| 5,334,108 A * | 8/1994 | Lamers | | 474/8 |
| 5,342,247 A * | 8/1994 | Adriaenssens | | 474/16 |
| 5,427,578 A * | 6/1995 | Iijima | | 474/18 |
| 5,676,612 A * | 10/1997 | Schellekens et al. | | 474/18 |
| 5,776,022 A * | 7/1998 | Schellekens | | 474/18 |
| 6,015,359 A * | 1/2000 | Kunii | | 474/18 |
| 6,152,843 A * | 11/2000 | Murakami | | 474/28 |
| 6,174,253 B1 * | 1/2001 | Walter et al. | | 474/18 |
| 6,190,274 B1 * | 2/2001 | Walter | | 474/28 |
| 6,234,925 B1 * | 5/2001 | Walter | | 474/18 |
| 6,241,635 B1 * | 6/2001 | Schmid et al. | | 474/11 |
| 6,280,357 B1 * | 8/2001 | Van Spijk | | 474/16 |
| 6,361,456 B1 * | 3/2002 | Walter | | 474/18 |
| 6,361,470 B1 * | 3/2002 | Friedmann et al. | | 477/37 |
| 6,500,090 B2 * | 12/2002 | Kanda et al. | | 477/45 |
| 6,824,483 B1 * | 11/2004 | Van Der Laan et al. | | 474/28 |
| 6,835,147 B2 * | 12/2004 | Iwata et al. | | 474/28 |
| 6,962,542 B2 * | 11/2005 | Van Spijk | | 474/18 |
| 7,264,564 B2 * | 9/2007 | Walter | | 474/28 |
| 8,052,555 B2 * | 11/2011 | Muller et al. | | 474/18 |
| 8,147,370 B2 * | 4/2012 | Nakajima et al. | | 475/210 |
| 8,864,610 B2 * | 10/2014 | Kadokawa | | 474/8 |
| 2001/0016528 A1 * | 8/2001 | Kashiwase | | 474/28 |
| 2001/0044350 A1 * | 11/2001 | Nishigaya et al. | | 474/18 |
| 2002/0142870 A1 * | 10/2002 | Okano et al. | | 474/28 |
| 2003/0013566 A1 * | 1/2003 | Vorndran et al. | | 474/18 |
| 2003/0216200 A1 * | 11/2003 | List | | 474/28 |
| 2004/0033851 A1 * | 2/2004 | Lubben | | 474/8 |
| 2004/0058760 A1 * | 3/2004 | Kuroda et al. | | 474/18 |
| 2004/0214669 A1 * | 10/2004 | Katou et al. | | 474/28 |
| 2005/0014584 A1 * | 1/2005 | Katou et al. | | 474/28 |
| 2005/0107195 A1 * | 5/2005 | Katou | | 474/28 |
| 2005/0192132 A1 * | 9/2005 | Faust et al. | | 474/18 |
| 2005/0272539 A1 * | 12/2005 | Kouta | | 474/18 |
| 2006/0009321 A1 * | 1/2006 | Carlson et al. | | 474/18 |
| 2006/0052192 A1 * | 3/2006 | Walter | | 474/28 |
| 2006/0058127 A1 * | 3/2006 | Walter et al. | | 474/8 |
| 2009/0017958 A1 * | 1/2009 | Kurihara | | 475/210 |
| 2010/0240480 A1 * | 9/2010 | Ogawa | | 474/28 |

FOREIGN PATENT DOCUMENTS

| | | |
|---|---|---|
| JP | 2006-300243 A | 11/2006 |
| JP | 20102044 A | 1/2010 |
| JP | 2010-181017 A | 8/2010 |

* cited by examiner

BELT-DRIVEN CONTINUOUSLY VARIABLE TRANSMISSION

CROSS REFERENCE TO RELATED APPLICATIONS

This application is a National Stage of International Application No. PCT/JP2011/058298 filed Mar. 31, 2011, the contents of all of which are incorporated herein by reference in their entirety.

TECHNICAL FIELD

The present invention relates to a belt-driven continuously variable transmission comprised of a pair of pulleys and a driving belt applied between those pulleys.

BACKGROUND ART

A belt-driven continuously variable transmission adapted to change a speed ratio continuously using a driving belt is known in the art. The belt-driven continuously variable transmission is comprised of a primary pulley and secondary pulley arranged in parallel fashion, and a driving belt running on those pulleys to transmit power therebetween. Each of the pulleys is individually comprised of a fixed sheave integrated with a rotary shaft, and a movable sheave fitted onto the rotary shaft while being allowed to reciprocate thereon. A conical face is formed on an inner face (as will be called a "pulley face" hereinafter) of each sheave to be opposed to each other. Therefore, the driving belt being contacted to the pulley face transmits the power frictionally therebetween.

When transmitting a torque frictionally between the driving belt and the pulley, the movable sheave has to withstand a reaction force from the driving belt against a thrust force pushing the movable sheave, and when the torque being transmitted is increased, the reaction force is also increased. In this situation, the movable sheave is flexurally deformed by the reaction applied thereto. Consequently, a friction between the driving belt and the sheaves may be reduced and a speed ratio may be varied. Japanese Patent Laid-Opens Nos. 2010-181017 and 2000-170859 disclose belt-driven continuously variable continuously variable transmissions adapted to prevent a flexural deformation of the movable sheave. Specifically, Japanese Patent Laid-Open No. 2010-181017 discloses a belt-driven continuously variable continuously variable transmission in which a thrust force is applied to an outer circumferential portion and to an inner circumferential portion of the movable sheave. Meanwhile, Japanese Patent Laid-Open No. 2000-170859 discloses a belt-driven continuously variable continuously variable transmission in which a thrust force is applied to a portion of the movable sheave radially outside of a contact point at which the driving belt moved to the maximum diameter position comes into contact therewith.

Meanwhile, the flexural deformation of the movable sheave caused by a load applied thereto from the driving belt may be reduced by thus modifying the belt-driven continuously variable continuously variable transmission. However, the movable sheave is fitted onto the rotary shaft integrated with the fixed sheave, in other words, the rotary shaft of the fixed sheave is inserted into a hollow shaft of the movable sheave. That is, a slight clearance remains inevitably between an inner surface of the hollow shaft of the movable sheave and an outer surface of the rotary shaft of the fixed sheave. Therefore, the movable sheave may be inclined by a reaction force from the driving belt thereby reducing the friction force and changing a speed ratio unintentionally.

DISCLOSURE OF THE INVENTION

In order to solve the foregoing technical problems, it is an object of this invention to provide a belt-driven continuously variable transmission adapted to prevent a tilting motion of the movable sheave.

A belt-driven continuously variable transmission of the present invention is comprised of a pair of pulleys and a driving belt applied to those pulleys to transmit power therebetween. Each of the pulleys is individually comprised of a fixed sheave rotated integrally with a rotary shaft, and a movable sheave fitted onto the rotary shaft while being allowed to reciprocate in an axial direction of the rotary shaft. According to the present invention, the belt-driven continuously variable transmission is characterized by a stopper member that is disposed on an outer circumferential side and in a side where the driving belt is not contacted with the movable sheave, so as to prevent the movable sheave from being tilted to widen a width between the fixed sheave and the movable sheave holding the driving belt by a load from the driving belt.

Specifically, the stopper member is adapted to restrict an axial position of the movable sheave when an effective diameter position of the driving belt is displaced to an outermost position.

The belt-driven continuously variable transmission of the present invention is further comprised of a hydraulic actuator that is disposed on a back side of the movable sheave which is opposite to a side opposed to the fixed sheave to apply a thrust to the movable sheave in the axial direction. The movable sheave is comprised of a member that is moved in the axial direction along an inner face of the outer circumferential portion of the hydraulic actuator, and the stopper member is disposed on the inner face of the hydraulic actuator at a position to be brought into contact with said member of the movable sheave when the movable sheave is tilted in a direction to widen the width between the movable sheave and the fixed sheave holding the driving belt.

Thus, according to the present invention, the belt-driven continuously variable transmission is provided with the stopper member that is disposed on an outer circumferential side and in a side where the driving belt is not contacted with the movable sheave, so as to prevent the movable sheave from being tilted to widen a width between the fixed sheave and the movable sheave holding the driving belt by a load from the driving belt. Specifically, a distance between a gravity center of the movable sheave and the stopper member is longer than a distance between the gravity center of the movable sheave and a contact point between the driving belt and the movable sheave. Therefore, a force for restricting a tilting motion of the movable sheave, that is, a reaction force for counteracting the moment can be increased. For this reason, a width between the movable sheave and the fixed sheave holding the driving belt therebetween will not be widened so that the belt clamping pressure will not be reduced and the speed ratio will not be varied.

As described, according to the present invention, the stopper member is adapted to restrict an axial position of the movable sheave when the effective diameter position of the driving belt is displaced to the outermost position. Therefore, the stopper member is allowed to restrict not only a tilting motion but also an axial movement of the movable sheave.

In addition, according to the present invention, the stopper member is disposed on the inner face of the hydraulic actuator at a position to be brought into contact with said member of the movable sheave moved in the axial direction along the inner face of the outer circumferential portion of the hydraulic actuator, when the movable sheave is tilted in a direction to widen the width between the movable sheave and the fixed sheave holding the driving belt. Therefore, the stopper member will not increase the size of the pulley.

BEST MODE FOR CARRYING OUT THE INVENTION

Figure 1:
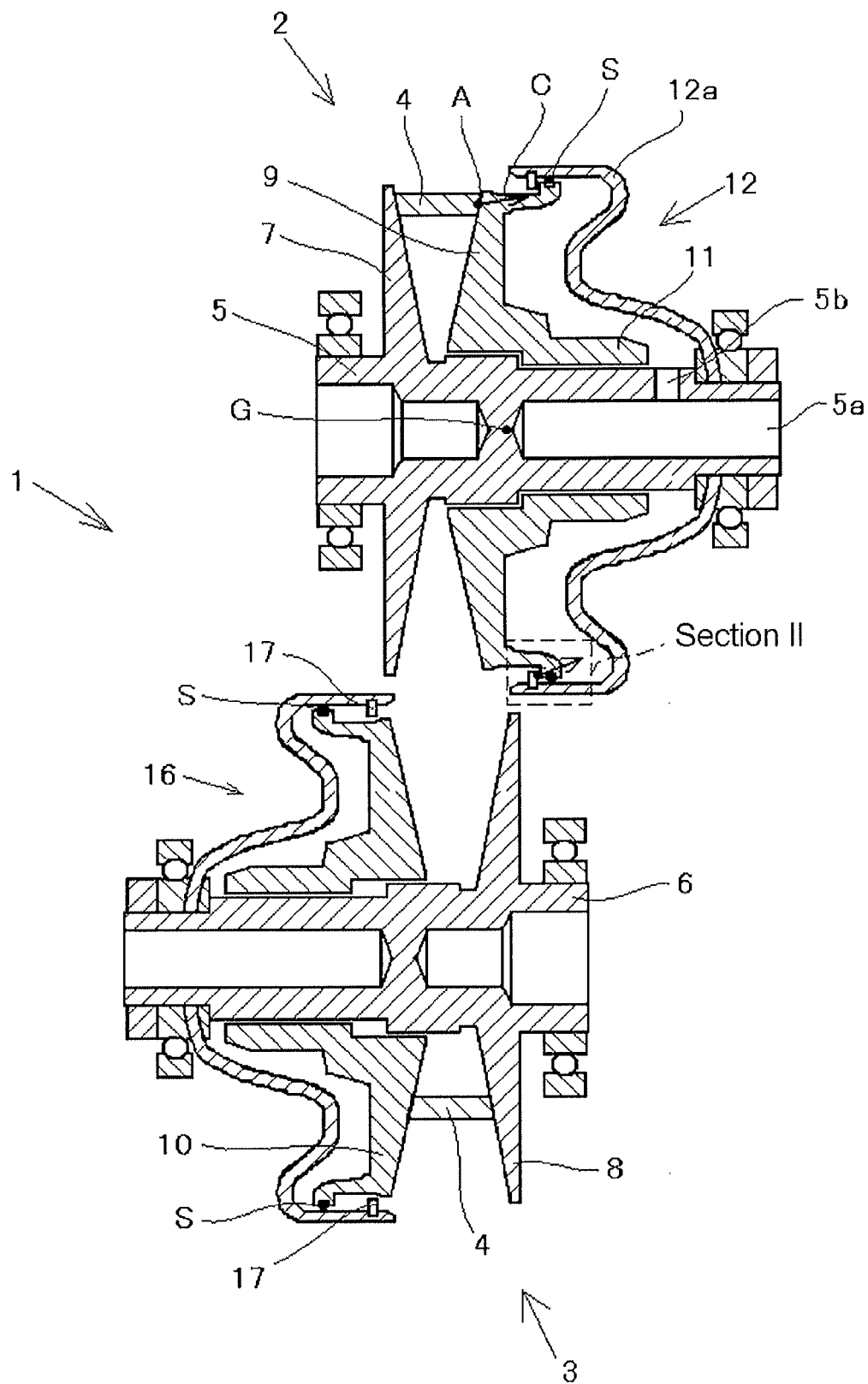
FIG. 1 is a view schematically showing a preferred example of the belt-driven continuously variable transmission according to the present invention.

Next, a preferred example of the present invention will be explained hereinafter. Referring now to FIG. 1, there is shown a cross-section of the belt-driven continuously variable transmission according to the present invention. As can be seen from FIG. 1, a basic structure of the belt-driven continuously variable transmission 1 is similar to that of the conventional one. Specifically, the belt-driven continuously variable transmission 1 is comprised of a primary pulley 2 rotated by a power from a not shown prime mover such as engine and a motor, a secondary pulley 3 rotated by a power transmitted from the primary pulley 2, and a driving belt 4 applied to those pulleys 2 and 3 to transmit the power therebetween. Each pulley 2, 3 is individually comprised of a fixed sheave 7, 8 integrated with an rotary shaft 5, 6, and a movable sheave fitted onto the rotary shaft 5, 6 while being allowed to reciprocate in an axial direction. As can be seen, structures of the primary sheave 2 and the secondary sheave 3 are substantially identical to each other. Therefore, only the structure of the primary sheave 2 will be explained in the following for the sake of convenience.

As described, the fixed sheave 7 is formed integrally with the rotary shaft 5 so that the fixed sheave 7 and the rotary shaft 5 are rotated at a same speed. Meanwhile, the movable sheave 9 is allowed to move in the axial direction of the rotary shaft 5, and rotated at the same speed as the fixed sheave 7. Specifically, a hollow shaft 11 is formed integrally with the movable sheave 9, and an inner circumferential face of the hollow shaft 11 is engaged with an outer circumferential face of the rotary shaft 5 through a spline or a key. Therefore, the movable sheave 9 is not only allowed to be rotated at the same speed as the fixed sheave 7 by the rotary shaft 5, but also allowed to be reciprocated on the rotary shaft 5 along the spline or the key.

In this preferred example, a hydraulic actuator 12 for reciprocating the movable sheave 9 in the axial direction is arranged on a back side of the movable sheave 9, that is, on an opposite side of the fixed sheave 7. The hydraulic actuator 12 is comprised of a cylinder 12a connected with an outer circumferential face of the rotary shaft 5 and the movable sheave 9 thereby forming a hydraulic chamber. Meanwhile, a passage 5a is formed inside of the rotary shaft 5 along the axial direction, and a passage 5b is formed to provide fluid communication between the passage 5a and the hydraulic chamber. Therefore, the movable sheave 9 is moved in the axial direction according to an amount or pressure of hydraulic fluid delivered to the hydraulic chamber from a not shown oil pump via the passages 5a and 5b.

The primary pulley 2 thus structured transmits power to the driving belt 4 by a frictional force resulting from clamping the driving belt 4 by the fixed sheave 7 and the movable sheave 9. As described, the hollow shaft 11 is allowed to reciprocate on the rotary shaft 5, that is, a clearance exists between the hollow shaft 11 and the rotary shaft 5. Therefore, the movable sheave 9 may be tilted or inclined with respect to a center axis passing through a gravity center G of the movable sheave 9, by the reaction force of the driving belt 4 against the thrust force applied to the movable sheave 5 to clamp the driving belt 4.

Figure 2:
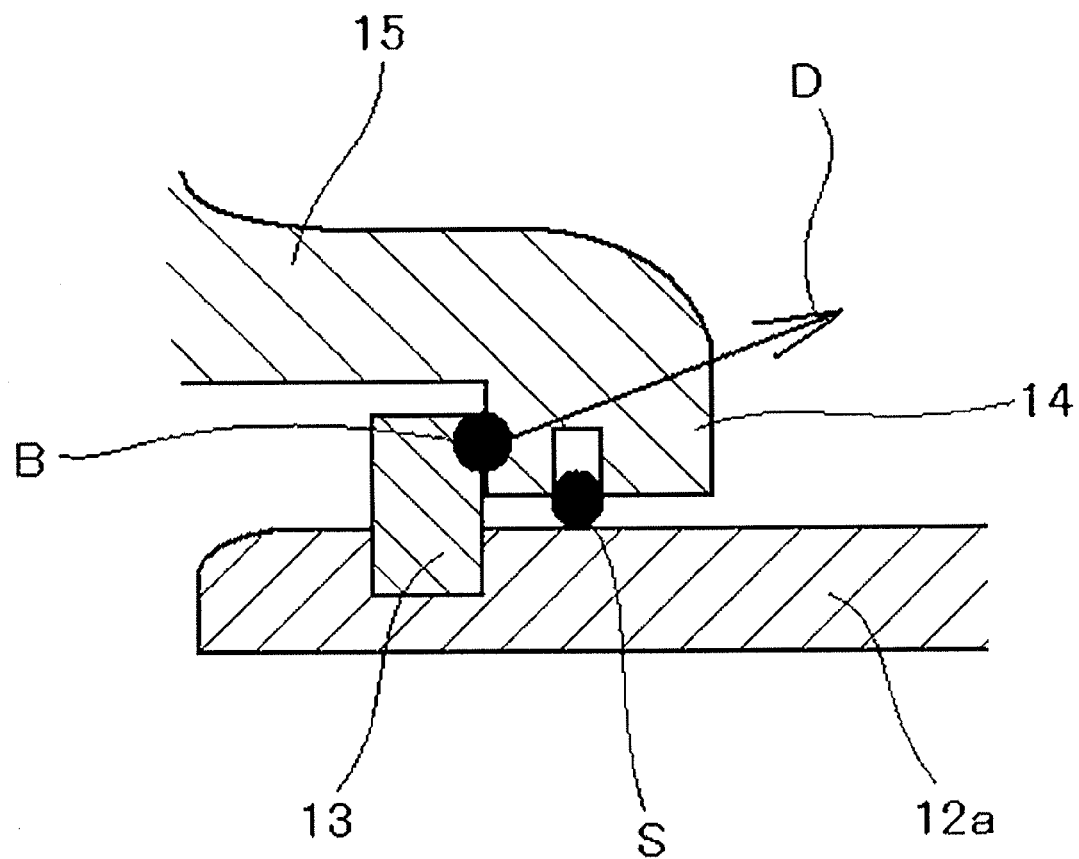
FIG. 2 is a closeup of the section II in FIG. 1.

In order to prevent such inclination or tilting motion of the movable sheave 9, according to the present invention, the belt-driven continuously variable transmission 1 is provided with a snap ring 13 serving as the stopper member of the present invention. The structure for restricting inclination of the movable sheave 9 will be explained in more detail with reference to FIGS. 1 and 2. First of all, moment acting on the movable sheave 9 will be explained. Moment of force acting on the movable sheave 9 is a product of: a reaction force of the driving belt 4 applied to a contact point (a point of application hereinafter) A between the driving belt 4 and the movable sheave 9 against the thrust force for clamping the driving belt 4; and a distance between the gravity center G and the point of application A. Specifically, the moment of force acting on the movable sheave 9 is a product of: a force applied to the movable sheave 9 in the direction perpendicular to a line connecting the gravity center G and the point of application A, that is, in the direction indicated by arrow C; and the distance between the gravity center G and the point of application A. Therefore, such moment of force increases with a displacement of the driving belt 4 toward the outer circumferential side.

In order to prevent the movable sheave 9 from being inclined by the moment of force, the snap ring 13 is disposed on an inner circumferential face of the cylinder 12a, and the movable sheave 9 is provided with a flange 14 to be brought into contact with the snap ring 13. Specifically, a cylindrical portion 15 is formed on an outer circumferential edge of the back face of the movable sheave 9 to protrude in the axial direction, and the flange 14 is formed on an outer circumferential edge of the cylindrical portion 15 to be brought into contact with the snap ring 13. In addition, the snap ring 13 and the flange 14 are arranged in such a manner that the flange 14 comes into contact with the snap ring 13 when the movable sheave 9 is situated closest to the fixed sheave 7. In order to prevent leakage of the fluid from the hydraulic actuator 12, a sealing member S such as an O-ring is interposed between the inner surface of the cylinder 12a and an end face of the flange 14. According to this preferred example, a distance between the gravity center G and a contact point B at which the flange 14 comes into contact with the snap ring 13 is longer than a distance between the gravity center G and the point of application A. Therefore, moment of force counteracting the moment of force derived from the reaction force applied to the movable sheave 9 from the driving belt 4, that is, the moment of force acting in the direction indicated by arrow D can be increased. Consequently, the inclination of the movable sheave 9 is reduced.

Next, an action of the belt-driven continuously variable transmission 1 mounted on a vehicle will be explained hereinafter. The belt-driven continuously variable transmission 1 is adapted to change a speed ratio in a manner to drive the prime mover while optimizing fuel economy. Specifically, the speed ratio is changed by displacing an effective diameter position of the driving belt 4 in the primary pulley 2 by changing a clearance between the sheaves 6 and 7. Meanwhile, the clamping pressure for holding the driving belt 4 at the diameter position of the current speed ratio is established by the secondary pulley 3. For this purpose, a delivery amount of the hydraulic fluid to the hydraulic actuator 12 of the primary pulley 2 is changed to reciprocate the movable sheave 9 thereby changing the speed ratio. Likewise, a delivery amount of the hydraulic fluid to the hydraulic actuator 16 of the secondary pulley 3 is changed to control the thrust force of the movable sheave 9 in the axial direction.

The fuel economy of the vehicle can be improved by reducing the speed ratio of the belt-driven continuously variable transmission 1 thus structured. To this end, the speed ratio is reduced to the minimum ratio when the vehicle is running at a constant high speed. In this situation, the diameter position of the driving belt 4 in the primary pulley 2 is displaced to the outermost position so that the moment of force applied to the movable is increased to the maximum value. However, as described, the flange 14 of the movable sheave 9 is bought into contact with the snap ring 13 when the speed ratio is reduced to the minimum ratio. Therefore, when the speed ratio is thus reduced to the minimum ratio, the snap ring 13 creates a load counteracting the moment of force acting on the movable sheave 9. As also described, the snap ring 13 is situated at the position further than the point of application A from the gravity center G, in other words, the snap ring 13 is situated in the outer circumferential side of the point of application A. Therefore, it is possible to counteract the moment of force applied to the movable sheave 9 by a relatively small load created by the snap ring 13. For this reason, hardness of the snap ring 13 functioning as the stopper member may be reduced.

In addition, the snap ring 13 and the flange 14 of the movable sheave 9 may have a dimensional tolerance individually. Therefore, a clearance may exist between the snap ring 13 and the flange 14 inevitably even if the movable sheave 9 is moved to the closest position to the fixed sheave 7 to reduce the speed ratio to the minimum ratio. In this case, the movable sheave 9 may be tilted or inclined by the moment of force applied thereto until stopped by the flange 14. However, the contact point between the flange 14 and the snap ring 13 is situated in the substantially outermost side of the movable sheave 9. Therefore, it is possible to restrict the tilting angle of the movable sheave 9 to the substantially minimum angle with respect to the play between the snap ring 13 and the flange 14. Thus, an inevitable inclination of the movable sheave 9 can be reduced.

The snap ring thus serving as the stopper member of the present invention may be disposed not only on the primary pulley 2 but also on the secondary pulley 3. In the vehicle thus structured, the speed ratio is increased to the maximum ratio to generate large torque when starting the vehicle. In this situation, the movable sheave 10 of the secondary pulley 3 may be inclined by the large moment of force applied thereto. Therefore, in order to avoid reduction of the clamping force resulting from such inclination of the movable sheave 10, a snap ring 17 may be disposed on the secondary pulley 3 to restrict the inclination of the secondary pulley 3.

Thus, in the belt-driven continuously variable transmission 1 of the present invention, the inclination of the movable sheave 9 is restricted at the point further than the point receiving the reaction force of the driving belt 4 from the gravity center G. Therefore, the stopper member is not necessarily to have a function to restrict axial movement of the movable sheave 9. That is, alternatively, the snap ring may be disposed on arbitrary portion of the inner wall of the cylinder. In this case, a member to be contacted with the snap ring is disposed at a portion of the movable sheave to be brought into contact with the snap ring when the effective diameter position of the driving belt is displaced to the outermost position and the movable sheave is thereby inclined.

In the foregoing preferred example, the stopper member is arranged inside of the cylinder 12a. However, the stopper member may also be arranged outside of the cylinder 12a. In this case, for example, a protrusion is formed on an outer face of the cylinder, and the stopper member is disposed on a not shown casing or the like at a position to be brought into contact with the protrusion when the effective diameter position of the driving belt is displaced to the outermost position and the movable sheave is thereby inclined.

In the foregoing preferred example, the present invention is applied to the belt-driven continuously variable transmission 1 adapted to transmit the power frictionally through the driving belt 4 clamped by the fixed sheave 7 and the movable sheave 9. Accordingly, the present invention may be applied not only to a belt-driven continuously variable transmission in which the sheaves 7 and 9 made of metal are lubricated by oil, but also to a belt-driven continuously variable transmission in which the conical face of each sheave 7 and 9 is individually covered with resin. In addition, a mechanism comprised of an electric motor and a ball screw may also be used as the actuator of the movable sheave 9 instead of the hydraulic actuator 12.

The invention claimed is:

1. A belt-driven continuously variable transmission, comprising:
a pair of pulleys, that is individually comprised of a fixed sheave rotated integrally with a rotary shaft, and a movable sheave fitted onto the rotary shaft while being allowed to reciprocate in an axial direction of the rotary shaft;
a driving belt applied to the pulleys to transmit power therebetween; and
a stopper member that is disposed on an outer circumferential side and in a side where the driving belt is not contacted with the movable sheave, so as to prevent the movable sheave from being tilted to widen a width between the fixed sheave and the movable sheave holding the driving belt by a load from the driving belt;
wherein the stopper member is adapted to restrict an axial position of the movable sheave when an effective diameter position of the driving belt is displaced to an outermost position.

2. The belt-driven continuously variable transmission as claimed in claim 1, further comprising:
a hydraulic actuator that is disposed on a back side of the movable sheave which is opposite to a side opposed to the fixed sheave to apply a thrust to the movable sheave in the axial direction;
wherein the movable sheave is comprised of a member that is moved in the axial direction along an inner face of the outer circumferential portion of the hydraulic actuator; and
wherein the stopper member is disposed on the inner face of the hydraulic actuator at a position to be brought into contact with said member of the movable sheave to counteract a moment of force derived from a reaction force applied from the driving belt to tilt the movable sheave situated closest to the fixed sheave.

\* \* \* \* \*